3,296,352
TUBULAR FILM MANUFACTURE
Aubrey Frank Riggs, Knebworth, England, assignor to Imperial Chemical Industries Limited, London, England, a corporation of Great Britain
Filed July 20, 1962, Ser. No. 211,174
Claims priority, application Great Britain, July 28, 1961, 27,439/61
12 Claims. (Cl. 264—290)

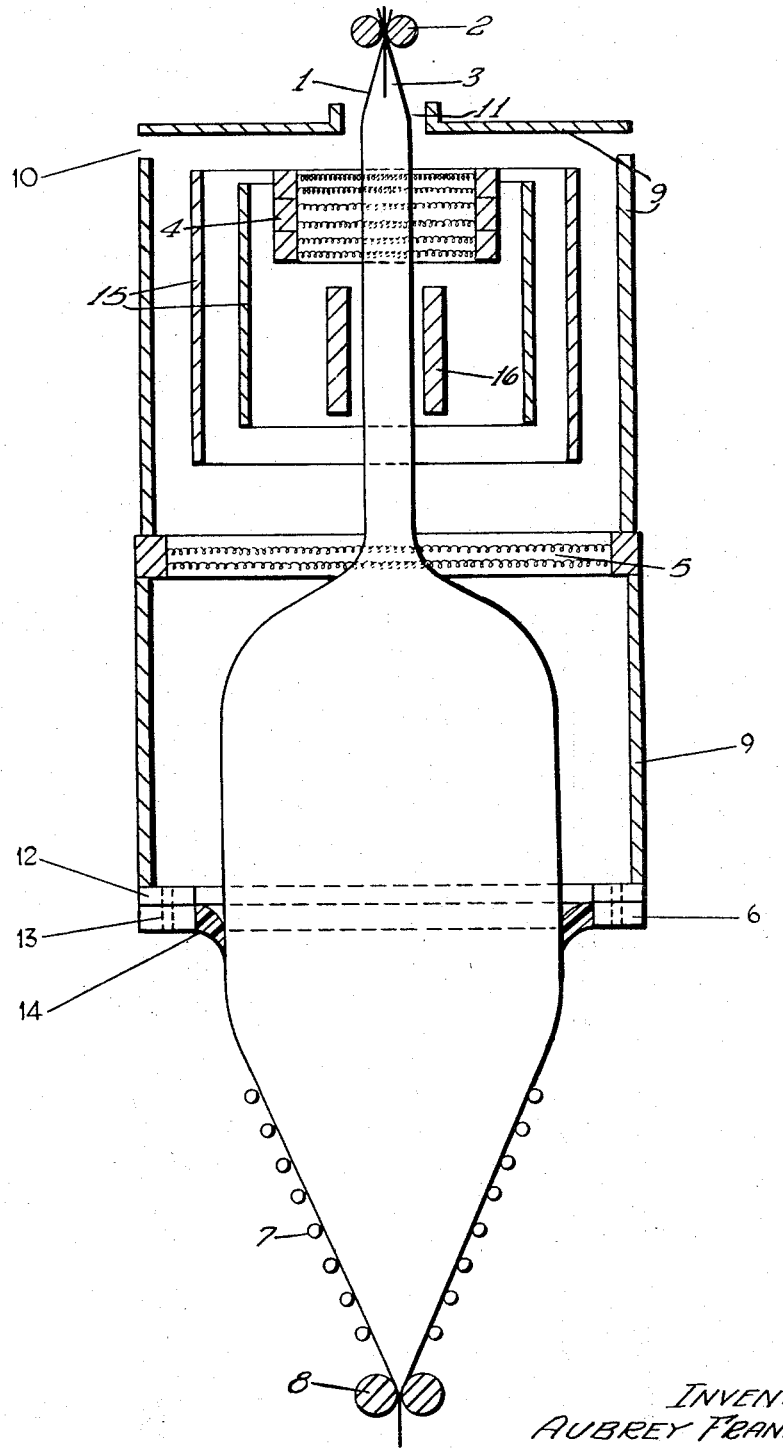

This invention relates to thermoplastic, biaxially oriented film manufactured by a tubular process and to apparatus for such manufacture. It also relates to film made by such a process. In such a tubular process an unoriented tube of thermoplastic is heated to a temperature at which orientation takes place on stretching and a biaxially oriented thermoplastic film, for instance a linear polyester film or a linear polyolefine film, may be obtained. An example of a film-forming linear polyester is polyethylene terephathalate and examples of film-forming linear polyolefines are high density polythene, polypropylene and poly-4-methyl-pentene-1.

A problem which arises in such a tubular film process is that the stretching bubble of film tends to wander during the operation of the process. Also, adventitious draughts tend to impinge upon the tube as it is being heated causing differential heating of the tube. Both this wandering and the uneven heating of the tube cause thickness variations in the stretched film. It has been found that this wandering is largely caused by adventitious draughts and the primary object of this invention is to reduce and control such draughts. In addition, it is an object to provide apparatus for carrying out the process of copending application, Serial No. 187,132, filed April 12, 1962, assigned to the assignee of the present application, in which a thermoplastic tube is biaxially oriented and is cooled at least over the last half of its zone of stretching by means of air draughts preferably while using a high bubble pressure in order to get stable stretching conditions, the resulting film having high tensile and shrinkage properties.

It has been found that the wandering of the tube can be substantially avoided and adventitious draughts of cool air can be kept off the tube which is being heated if, using infra-red heaters to heat the tube, the heaters and the tube are surrounded by a housing through which a vertical convection current is maintained.

It is believed that such a vertical convection current has a stabilising influence on the positioning of the tube and the stretching film and that it acts as a buffer keeping away adventitious draughts.

Accordingly the invention consists in a continuous vertical tubular biaxial orientation process of thermoplastic film manufacture in which a thermoplastic tube is continuously fed downwards, heated to a temperature below its softening point which is suitable for orientation and is stretched by inflation to biaxially orient it, characterised in that the tube is heated to the said temperature by one or more infra-red heaters which are enclosed in a housing surrounding them and the tube, through which housing a controlled circumferential substantially vertical upwardly flowing air current is maintained.

The invention also consists in an apparatus for the operation of such a process comprising means to advance a thermoplastic tube vertically downwards into and withdraw it when stretched from the apparatus, infra-red heaters mounted to heat the tube to a temperature suitable for orientation, means to inflate the tube and a housing surrounding the infra-red heaters having at its ends a circumferential inlet and a circumferential outlet for the passage of a controlled circumferential substantially vertically upward air current.

The housing may surround the infrared heaters and the whole zone of stretching of the film. However, this is not always essential and a housing which merely surrounds the infra-red heaters themselves in so far as it comes down to at least the same level as the lowest infra-red heater is often adequate. In this context the term "surrounds" means that the housing is circumscribed about the infra-red heaters but that it does not necessarily wholly enclose them.

The process which is the subject of copending application Serial No. 187,132 and the process of the present invention may be usefully combined in their action since a cooling curtain of air directed at the stretching tube where it finishes, or has finished, stretching and then allowed to become part of the vertical upward current in accordance with this invention aids the stabilising action on the tube and the stretching film. Thus, the film which is stretching may be cooled by means of an upwardly flowing current of air which is "force-fed" around the tube where it finishes, or has finished, stretching. If the housing surrounds not only the infra-red heaters, but also the stretching tube of film, the "force-feed" may be into the circumferential inlet to the housing below the said heaters. However, this lower part of the housing may be omitted and the cooling air "force-fed" around the tube. This latter is convenient since in many situations the full stabilising action of the further housing is unnecessary and its omission makes it easier for operators to gain access to the tube of film, for instance, to enable start-up and clearance of waste material after a burst.

The process and apparatus according to the invention are now illustrated with reference to the accompanying drawing.

A tube of thermoplastic 1 (for instance a polypropylene tube) is passed downwardly between nip rollers 2 wherein there is a probe for admission of an inflating gas (see British specification No. 787,479). The tube passes through wire-wound infra-red heaters 4 and 5 at 800° C,. and a ceramic heater 16 at 500° C., stretches, passes through a baffle 6 and, after being collapsed by guide rollers 7, is taken off by nip rollers 8.

Housing 9 surrounding the tube and infra-red heaters is provided with circumferential openings 10 and 11 for the passage of air therethrough, which will be outwards through 10 and may be either outwards or inwards through 11 during the operation of this process. The baffle 6 mounted at the lower end of the housing 9 consists of two superposed circumferentially moveable rings 12 and 13 having apertures which, by relative rotation of the rings can be brought into or taken out of register so that the ingress of air can be controlled. One of the rings 13 has mounted on it a ring 14 of polyethylene terephthalate staple fiber in which the fibres project inwardly against and are deflected downwardly by the stretched tube.

The upper part of the housing 9 has cylindrical guides 15 which reduce turbulence and encourage the convection current towards laminar flow.

The housing may be partially sealed where the stretched tube leaves the housing by a baffle according to our British application No. 14924/59 which baffle comprises a sheet having a hole for the stretched tube which is normally of smaller diameter than the tube and radially slit to form segments which are deflected by the tube, the sheet having a surface of polytetrafluoroethylene where it touches the tube. The housing may also, as above, be sealed by means of a baffle having a hole for the stretched tube which is of larger diameter than the tube and which is sealed against the tube by means of strips or filaments of flexible material projecting inwardly and displaced by the tube. Conveniently the material may consist of polyester, nylon or cellulosic staple fibres.

The air supplied at one end of the housing, e.g. through the rings 12 and 13 may be supplied cold or heated and may, as desired, be merely allowed to go into the housing as a convection current or may "force-fed" particularly as a coolant as mentioned above.

The infra-red heaters may be ceramic furnaces run at 500–600° C., wire-wound heaters at 700° C. to 1100° C. or enclosed carbon filament or tungsten filament lamps at up to 3,500° K. as is desired.

Control of the air current may be adjustable, e.g. by the use of the rings 12 and 13, or alternatively it may be preset and the dimensions of the openings 10 and 11 adjusted before start-up.

This process may also be operated using apparatus different from that shown in the accompanying drawing e.g. rings 12 and 13 and that part of the housing 9 below the heater 5 can be omitted and control of the convection current achieved by adjusting the dimensions of the openings 10 and 11. In this case the (lower) inlet is merely the annular space between the infra-red heater 5 and the expanded tube. Alternatively only the lower part of the housing may be omitted and rings 12 and 13 used to introduce a coolant.

A further advantage of introducing cooling air through the lower inlet to housing 9 is that it allows the use of relatively high inflation pressures in the tube and/or relatively high stretch ratios along the direction of movement of the film, whereby film having a high degree of transparency and high tensile strength and shrinkage properties may be produced.

In yet a further way of operating this invention using apparatus modified from that depicted in the accompanying drawing, rings 12 and 13 (and, if desired, the lower part of housing 9 also) may be omitted and means provided for varying the flow of coolant locally around the circumference of the film whereby any thickness variations which may appear, during the operation of this process may be reduced or even eliminated. Such means may comprise for example a ring having the same internal and external diameters as ring 13, as shown, but having a substantially continuous annular opening therethrough instead of the series of apertures of ring 13, and a series of circumferentially spaced members movable radially over a horizontal surface of ring 13, so that the effective width of the annular opening at different locations around its circumference can be varied, such means normally being used in conjunction with means for "force-feeding" coolant through the annular opening. Thus when relatively "thick spots" are detected in the stretched film the flow of coolant into the annular opening at that part of its circumference nearest to where the film having such "thick spots" passes through the ring should be decreased by reducing the effective width of the opening at that part of its circumference. Similarly, where local "thin spots" are formed, the air flow should be increased locally.

I claim:

1. In a continuous biaxial orientation process in which a tubular thermoplastic film is continuously advanced vertically downwards, heated to a temperature below its softening point which is suitable for orientation and is stretched by inflation to biaxially orient it, and withdrawing the stretched film, the improvement which comprises heating the tubular film to the said temperature by passing it through heating means comprising at least one infra-red heater enclosed in a housing and simultaneously applying a forced current of air around the circumference of the tubular film in a substantially vertically upward direction through said enclosed infra-red heater to substantially eliminate differential heating effects, thickness variations and wandering of said tubular film.

2. A process according to claim 1 in which the current of air is applied initially to the tubular film where it has finished stretching.

3. A process according to claim 1 in which the tubular film which is stretching is cooled by means of the air current over at least the last half of the zone where the stretching occurs.

4. In an apparatus for the continuous biaxial orientation of thermoplastic film including means for extruding a thermoplastic film, means for advancing the tubular film, heating means to heat the tubular film to a temperature suitable for orientation and means to inflate the tubular film to stretch and biaxially orient it, the improvement comprising a housing surrounding the heating means and the tubular film, said housing having an inlet and outlet for the tubular film, and means supplying a controlled upwardly flowing current of air to surround the tubular film in said housing to eliminate differential heating effects, thickness variations and wandering of said tubular film and wherein said means for supplying a controlled upwardly flowing current of air comprises two superposed circumferentially movable rings having apertures capable of being brought in and out of register with each other on relative rotation thereof to control the supply of air to said housing.

5. An apparatus according to claim 4 wherein the air is supplied by positive force-feeding means.

6. In an apparatus for the continuous biaxial orientation of thermoplastic film by a tubular process, comprising means for advancing a tubular thermoplastic film vertically downwards into and withdrawing it when stretched from the apparatus, heating means comprising at least one infra-red heater mounted to heat the tubular film to a temperature suitable for orientation, and means adapted to inflate the tubular film, the improvement comprising a housing surrounding the tubular film and the heating means, said housing having at its ends a circumferential inlet and a circumferential outlet for the passage of air therethrough, annular air-supply means surrounding the tubular film at a position where it has finished stretching, said air-supply means being adapted to apply a forced current of cooling air around the inflated tubular film whereby a circumferential, substantially vertical, upwardly flowing air current is caused to pass through said housing from said inlet to said outlet, and baffle means positioned interiorly of said air supply means and provided with a central hole for the passage of the tube.

7. An apparatus according to claim 6 including plural infra-red heaters.

8. An apparatus according to claim 7 wherein the housing extends down below the lowest infra-red heater.

9. An apparatus according to claim 7 wherein the housing extends down below the lowest infra-red heater and is closed at its base by said annular air-supply means.

10. An apparatus according to claim 6 wherein the surface of material on said baffle means comprises a plurality of inwardly projecting strips of fibre-forming polymeric material, said strips being adapted to undergo displacement in a generally downward direction at their free ends as the tubular film moves in contact therewith.

11. An apparatus according to claim 6 wherein said air-supply means comprises two superposed circumferentially movable rings having apertures capable of being brought in and out of register with each other on relative rotation thereof to control the supply of air to said housing.

12. In an apparatus for the continuous biaxial orientation of thermoplastic film including means for extruding a thermoplastic film, means for advancing the tubular film, heating means to heat the tubular film to a temperature suitable for orientation and means to inflate the tubular film to stretch and biaxially orient it, the improvement comprising a housing surrounding the heating means and at least the zone of stretching of the tubular film, said housing having an inlet and outlet for the tubular film, and means supplying a controlled upwardly flowing current of air to surround the tubular film in said housing to eliminate differential heating effects, thickness variations and wandering of said tubular film.

References Cited by the Examiner

UNITED STATES PATENTS

| | | |
|---|---|---|
| 2,433,937 | 1/1948 | Tornberg. |
| 3,061,876 | 11/1962 | Floyd et al. _____ 264—95 |
| 3,108,851 | 10/1963 | Hofer et al. _____ 264—290 X |
| 3,141,912 | 7/1964 | Goldman et al. ____ 264—290 X |

FOREIGN PATENTS

| | | |
|---|---|---|
| 245,571 | 9/1962 | Australia. |
| 1,224,548 | 6/1960 | France. |
| 924,571 | 4/1963 | Great Britain. |

ALEXANDER H. BRODMERKEL, *Primary Examiner.*
MORRIS LIEBMAN, *Examiner.*
C. B. HAMBURG, F. S. WHISENHUNT,
*Assistant Examiners.*